United States Patent Office 3,146,235
Patented Aug. 25, 1964

3,146,235
AMINOKETONE DERIVATIVES
Gust Nichols, Elkhart, Ind., assignor to Miles Laboratories, Inc., Elkhart, Ind., a corporation of Indiana
No Drawing. Filed Feb. 24, 1961, Ser. No. 91,326
11 Claims. (Cl. 260—268)

This invention relates to a novel group of aminoketone compounds. More particularly, this invention relates to aminoketone derivatives wherein a cyclic ketone is substituted at the position alpha to the keto group with a phenylpiperazinylmethyl radical.

The compounds of this invention may be represented as having the structural formula—

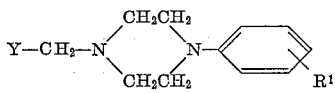

in which Y represents a cyclic ketone radical attached to the rest of the molecule at a position which is alpha to the keto group. For example, Y may represent any of the following radicals—

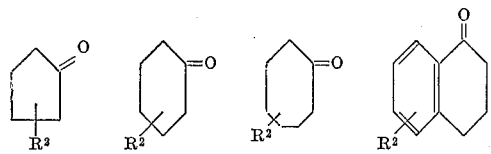

or

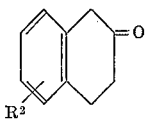

in which $R^2$ may be hydrogen, halogen, lower alkyl, or lower alkoxy and may be singly or multiply substituted at any point on the ring.

$R^1$ in the structural formula given above may be hydrogen, halogen, lower alkyl or lower alkoxy and may be singly or multiply substituted at any point on the benzene ring.

Representative of these compounds is 1-phenyl-4-(2-oxocyclohexylmethyl) piperazine which is the free base form has the structural formula—

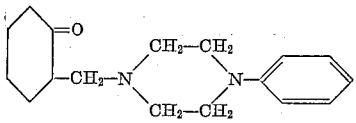

From the fact that these compounds are diamines, and therefore have two possible sites for salt formation, it is apparent that these compounds are capable of existing in the form of various salts. In fact, both the mono-ammonium salts and the diammonium salts have been isolated.

The compounds of this invention may be conveniently prepared by condensation of the appropriate phenylpiperazine salt with formaldehyde and the desired cyclic ketone. The reaction may be illustrated in accordance with the following equation—

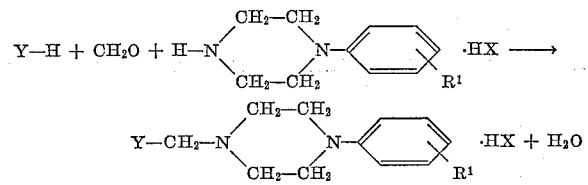

wherein Y and $R^1$ have the significance ascribed above and X is halogen, preferably Cl or Br.

Suitably, the hydrohalogen salt of the phenylpiperazine, paraformaldehyde or another source of formaldehyde, and the cyclic ketone may be condensed using an appropriate solvent such as ethyl alcohol.

In a preferred process for obtaining these compounds, the use of the monohydrohalogen salt of the diamine in either essentially anhydrous alcohol or an aqueous alcoholic medium results in the formation of reaction products which are readily obtainable in essentially pure crystalline form by concentration of the reaction mixture.

The free bases can be readily obtained from the salts and converted to other hydrohalogen salts if desired. They may also be converted to salts of other organic or inorganic acids including sulfuric, phosphoric, sulfamic, citric, lactic, maleic, tartaric and the like which are useful for formulation of the compounds of this invention into therapeutic compositions.

The novel aminoketone derivatives of this invention are useful as analgesics and may be formulated into therapeutic dosage forms in the conventional manner.

The invention will be better understood by reference to the following examples which illustrate in detail some of the compounds which comprise this invention and methods for their production. However, the invention is not to be construed as limited thereby in spirit or in scope. It will be apparent to those skilled in the art that numerous modifications in materials and methods can be adopted without departing from the invention.

EXAMPLE 1

*1-Phenyl-4-(2-Oxocyclohexylmethyl) Piperazine Monohydrobromide (Compound 1)*

A suspension of N-phenylpiperazine hydrobromide was prepared by adding a standard solution of hydrogen bromide in absolute ethanol to 648 g. (4 moles) of N-phenylpiperazine dissolved in absolute ethanol, converting it to the monohydrobromide. The total volume of alcohol used was 3400 ml. This suspension was brought to reflux and 8 ml. of concentrated hydrobromic acid and 490 g. (5 moles) of cyclohexanone were added. Then 198 g. (6 moles) of paraformaldehyde (91%) was added at the rate of 25 g. every 45 min., allowed to reflux for a total of 6.5 hr. and filtered hot using 50 g. of filter aid and washing the cake with 500 ml. of hot alcohol. The deep yellow solution crystallized readily. It was filtered and resuspended in 1.5 l. of isopropanol, again filtered and then washed with four 250 ml. portions of isopropanol which removed nearly all the color. Yield: 903 g. (64%), M.P. 168–170° C.

*Analysis.*—Calcd. for $C_{17}H_{25}BrN_2O$: Br, 22.62; N (Basic), 3.97. Found: Br, 22.90; N, 3.92.

EXAMPLE 2

*1-Phenyl-4-(2-Oxocyclohexylmethyl) Piperazine Monohydrochloride (Compound 2)*

A suspension of N-phenylpiperazine hydrochloride was prepared by adding a standard solution of hydrogen chloride in absolute ethanol to 81 g. (0.5 mole) of N-phenylpiperazine dissolved in absolute ethanol, converting it to the monohydrochloride. The total volume of alcohol used was 500 ml. This suspension was brought to reflux and 0.5 ml. of concentrated hydrochloric acid and 61.25 g. (0.625 mole) of cyclohexanone were added. Then a solution of 55 ml. of 37% formaldehyde (0.625 mole) dissolved in 100 ml. of absolute alcohol was added dropwise over a period of one hour. After the addition of 20 g. of filter aid, the reaction mixture was filtered hot, 200 ml. of isopropanol added, and concentrated on a steam bath under reduced pressure until a slush of crystals developed. These were filtered, washed color free with isopropanol and dried. Yield: 76 g. After recrystallization from chloroform-benzene the yield was 64 g. (41%), M.P. 167–168° C.

*Analysis.*—Calcd. for $C_{17}H_{25}ClN_2O$: Cl, 11.48; N (Basic), 4.53. Found: Cl, 11.68; N, 4.5.

It can be seen from Examples 1 and 2 that the salt corresponding to the piperazine salt used in the reaction is readily obtained according to this procedure. If it is desired to prepare other salts, another method which can be utilized is to liberate the free base with an alkali and to convert the liberated free base to the desired salt by treatment with the corresponding acid.

For example, upon treating 1-phenyl-4-(2-oxocyclohexylmethyl) piperazine monohydrobromide, the product of Example 1, with potassium carbonate, 1-phenyl-4-(2-oxocyclohexylmethyl) piperazine is liberated, which upon treatment with hydrogen chloride may be caused to yield the dihydrochloride.

This compound is shown as Compound 3 in Table 2 below.

Other compounds can be prepared using the procedure of Examples 1 and 2. These include the products obtained by use of the amines and ketones shown in Table 1. The products prepared are shown in Table 2 below.

TABLE 1

| Compound | Amine | Ketone |
|---|---|---|
| 4 | N-phenylpiperazine | 2-methylcyclohexanone. |
| 5 | ----do---- | 4-methylcyclohexanone. |
| 6 | ----do---- | 4-methoxycyclohexanone. |
| 7 | N-(2-chlorophenyl) piperazine | Cyclohexanone. |
| 8 | N-(4-chlorophenyl) piperazine | Do. |
| 9 | N-(4-methylphenyl) piperazine | Do. |

EXAMPLE 3

*1-(4-Chlorophenyl)-4-(2-Oxocyclopentylmethyl) Piperazine Monohydrobromide (Compound 10)*

A suspension of N-(4-chlorophenyl) piperazine hydrobromide was prepared by adding a standard solution of hydrogen bromide in absolute ethanol to 19.65 g. (0.1 mole) of N-(4-chlorophenyl) piperazine in absolute ethanol, converting it to the monohydrobromide. The total of alcohol used was 350 ml. This suspension was brought to reflux and 10.5 g. (0.125 mole) of cyclopentanone and 0.25 ml. of concentrated hydrobromic acid were added. Then 5 g. (0.15 mole) of paraformaldehyde (91%) was added in five portions over an 80 min. period. The reaction mixture was refluxed an additional 3 hours, filtered hot and allowed to crystallize in an ice box. The crude product was recrystallized from alcohol. Yield: 12 g. (36%), M.P. 159–161° C.

*Analysis.*—Calcd. for $C_{16}H_{22}BrClN_2O$: Br, 21.38; N (Basic), 3.75. Found: Br, 21.62; N, 3.77.

In a similar manner 1-phenyl-4-(2-oxocyclopentylmethyl) piperazine monohydrobromide can be prepared from cyclopentanone and N-phenylpiperazine monohydrobromide. This compound is shown as Compound 11 in Table 2 below.

EXAMPLE 4

*2-[1-(4-Chlorophenyl)-4-Piperazinylmethyl]-1-Tetralone Monohydrobromide (Compound 12)*

A standard solution of hydrogen bromide in absolute ethanol was added to a solution of 19.65 g. (0.1 mole) of N-(4-chlorophenyl) piperazine dissolved in absolute ethanol, converting it to a suspension of the monohydrobromide. Total volume of alcohol used was 125 ml. This suspension was brought to reflux under a nitrogen atmosphere and 18.25 g. (0.125 mole) of freshly distilled 1-tetralone and 0.25 ml. of concentrated hydrobromic acid were added. Then 5 g. (0.15 mole) of paraformaldehyde (91%) was added in five portions over a period of 90 minutes and refluxed an additional 3 hours. The crystals which developed were filtered and recrystallized from 900 ml. of methanol. Yield: 23 g. (52%), M.P. 192–194° C.

*Analysis.*—Calcd. for $C_{21}H_{24}BrClN_2O$: Br, 18.34; N (basic), 3.21. Found: Br, 18.51; N, 3.19.

The various compounds described in the above examples are shown in Table 2 with their physical and chemical characteristics.

TABLE 2

| No. | Compound—Chemical name and structure | Melting point, °C. | Formula and M.W. | Analysis Calcd. Br. | Analysis Calcd. N. (basic) | Analysis Found Br. | Analysis Found N. (basic) |
|---|---|---|---|---|---|---|---|
| 1 | 1-phenyl-4-(2-oxocyclohexylmethyl) piperazine monohydrobromide | 168–170 | $C_{17}H_{25}BrN_2O$ — 353.3 | 22.62 | 3.97 | 22.90 | 3.92 |
| 2 | 1-phenyl-4-(2-oxocyclohexylmethyl) piperazine monohydrochloride | 167–168 | $C_{17}H_{25}ClN_2O$ — 308.9 | 11.48 (Cl) | 4.53 | 11.68 (Cl) | 4.5 |
| 3 | 1-phenyl-4-(2-oxocyclohexylmethyl) piperazine dihydrochloride | 172 | $C_{17}H_{26}Cl_2N_2O$ — 345.4 | 20.54 (Cl) | 4.06 | 20.36 (Cl) | 4.14 |

TABLE 2—Continued

| No. | Compound—Chemical name and structure | Melting point, °C. | Formula and M.W. | Analysis Calcd. Br. | Analysis Calcd. N. (basic) | Analysis Found Br. | Analysis Found N. (basic) |
|---|---|---|---|---|---|---|---|
| 4 | 1-phenyl-4-(2-oxo-3-methylcyclohexylmethyl)-piperazine monohydrobromide. | 164–166 | $C_{18}H_{27}BrN_2O$ 367.3 | 21.76 | 3.81 | 21.90 | 3.83 |
| 5 | 1-phenyl-4-(2-oxo-5-methylcyclohexylmethyl)-piperazine monohydrobromide. | 169–170 | $C_{18}H_{27}BrN_2O$ 367.3 | 21.76 | 7.62 (total) | 21.95 | 7.66 (total) |
| 6 | 1-phenyl-4-(2-oxo-5-methoxycyclohexylmethyl)-piperazine monohydrobromide. | 154–155.5 | $C_{18}H_{27}BrN_2O_2$ 383.3 | 20.85 | 3.65 | 20.71 | 3.62 |
| 7 | 1-(2-chlorophenyl)-4-(2-oxocyclohexylmethyl) piperazine monohydrobromide. | 171–173 | $C_{17}H_{24}BrClN_2O$ 387.8 | 20.64 | 3.75 | 20.87 | 3.63 |
| 8 | 1-(4-chlorophenyl)-4-(2-oxocylohexylmethyl) piperazine monohydrobromide. | 173–174 | $C_{17}H_{24}BrClN_2O$ 387.8 | 20.61 | 3.61 | 20.53 | 3.65 |
| 9 | 1-(4-methylphenyl)-4-(2-oxocyclohexylmethyl) piperazine monohydrobromide. | 160–162 | $C_{18}H_{27}BrN_2O$ 367.3 | 21.76 | 7.62 (total) | 21.94 | 7.53 (total) |
| 10 | 1-(4-chlorophenyl)-4-(2-oxocyclopentylmethyl) piperazine monohydrobromide. | 159–161 | $C_{16}H_{22}BrClN_2O$ 373.8 | 21.38 | 3.75 | 21.62 | 3.77 |
| 11 | 1-phenyl-4-(2-oxocyclopentylmethyl) piperazine monohydrobromide. | 158–160 | $C_{16}H_{23}BrN_2O$ 339.3 | 23.56 | 4.13 | 23.56 | 4.07 |
| 12 | 2-[1-(4-chlorophenyl)-4-piperazinylmethyl]-1-tetralone monohydrobromide. | 192–194 | $C_{21}H_{24}BrClN_2O$ 435.8 | 18.34 | 3.21 | 18.51 | 3.19 |

In summary, this invention relates to certain aminoketone derivatives as defined by the structural formulas given above which have been found to be useful analgetic agents.

What is claimed is:

1. A compound selected from the group consisting of compounds having the structural formula

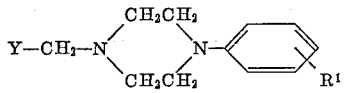

wherein Y is a radical of a cyclic ketone attached to the rest of the molecule at a position which is alpha to the keto group, said radical being a member selected from the group consisting of radicals having the structural formulae

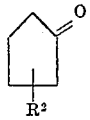 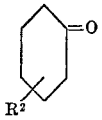 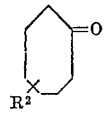 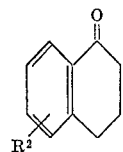

and

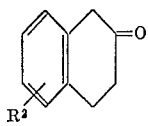

wherein $R^2$ is a member selected from the group consisting of hydrogen, halogen, lower alkyl and lower alkoxy, and $R^1$ is a member selected from the group consisting of hydrogen, halogen, lower alkyl and lower alkoxy, and salts of said compounds with pharmaceutically acceptable anions.

2. 1-phenyl-4-(2-oxocyclohexylmethyl) piperazine.
3. 1-phenyl-4-(2-oxo-3-methylcyclohexylmethyl) piperazine.
4. 1-phenyl-4-(2-oxo-5-methylcyclohexylmethyl) piperazine.
5. 1-phenyl-4-(2-oxo-5-methoxycyclohexylmethyl) piperazine.
6. 1-(2-chlorophenyl)-4-(2-oxocyclohexylmethyl) piperazine.
7. 1-(4-chlorophenyl)-4-(2-oxocyclohexylmethyl) piperazine.
8. 1-(4-methylphenyl)-4-(2-oxocyclohexylmethyl) piperazine.
9. 1-(4-chlorophenyl)-4-(2-oxocyclopentylmethyl) piperazine.
10. 1-phenyl-4-(2-oxocyclopentylmethyl) piperazine.
11. 2-[1-(4-chlorophenyl)-4-piperazinylmethyl]-1-tetralone.

References Cited in the file of this patent
UNITED STATES PATENTS 2,767,185    Baltzly _____ Oct. 16, 1956
2,887,488    Smiley _____ May 19, 1959

FOREIGN PATENTS 813,173    Great Britain _____ May 13, 1959

OTHER REFERENCES

Adams et al.: Organic Reactions, pp. 308–309, John Wiley and Sons, Inc., New York (1942).

Surrey: Name Reactions in Organic Chemistry, pp. 118–120, Academic Press Inc., publishers, New York (1954).

Godchot and Mousseron: Comptes Rendus, 194, 616–7 (1932).

Mousseron: Bull. Soc. Chim., 51, 782–807 (1932).

UNITED STATES PATENT OFFICE
CERTIFICATE OF CORRECTION

Patent No. 3,146,235                                    August 25, 1964

Gust Nichols

It is hereby certified that error appears in the above numbered patent requiring correction and that the said Letters Patent should read as corrected below.

Columns 5 and 6, TABLE 2, Item No. 4, before "piperazine" strike out the hyphen.

Signed and sealed this 20th day of April 1965.

(SEAL)
Attest:

ERNEST W. SWIDER                                   EDWARD J. BRENNER
Attesting Officer                                         Commissioner of Patents